US012009140B2

(12) United States Patent
Huang et al.

(10) Patent No.: US 12,009,140 B2
(45) Date of Patent: Jun. 11, 2024

(54) INTEGRATED STACK TRANSFORMER

(71) Applicant: Realtek Semiconductor Corp., HsinChu (TW)

(72) Inventors: Kai-Yi Huang, Taipei (TW); Cheng-Wei Luo, Hsinchu (TW); Chieh-Pin Chang, Hsinchu (TW); Ta-Hsun Yeh, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 598 days.

(21) Appl. No.: 17/114,524

(22) Filed: Dec. 8, 2020

(65) Prior Publication Data

US 2021/0193367 A1 Jun. 24, 2021

(30) Foreign Application Priority Data

Dec. 18, 2019 (TW) ................................ 108146367

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 17/0013; H01F 2017/0073; H01F 27/28
See application file for complete search history.

(56) References Cited

U.S. PATENT DOCUMENTS 6,750,652 B2 * 6/2004 Weyers .............. G01R 33/3628 324/318
6,794,977 B2 * 9/2004 Christensen ........ H01F 27/2885 336/200
9,712,195 B2 * 7/2017 Wang .................. H04B 1/1027
9,824,812 B2 11/2017 Huang
10,818,429 B2 * 10/2020 Yen ......................... H01F 27/29
10,951,197 B2 * 3/2021 Wiezell .................. H03H 11/04
11,469,028 B2 * 10/2022 Yen ......................... H01F 17/02
2007/0247269 A1 * 10/2007 Papananos .......... H01L 23/5227 336/200

(Continued)

FOREIGN PATENT DOCUMENTS

TW I660594 B 5/2019

*Primary Examiner* — Shawki S Ismail
*Assistant Examiner* — Matthew T Sarles
(74) *Attorney, Agent, or Firm* — Winston Hsu

(57) ABSTRACT

An integrated stack transformer is provided, wherein the integrated stack transformer includes a first winding, a second winding and a third winding implemented by a first metal layer, and a fourth winding and a fifth winding implemented by a second metal layer. The second winding is positioned between the first winding and the third winding, the fourth winding substantially overlaps the first winding, the fifth winding substantially overlaps the third winding, and a distance between the fifth winding and the fourth winding is less than a distance between the third winding and the first winding. The first winding, the third winding, the fourth winding and the fifth winding form a part of one of a primary inductor and a secondary inductor of the integrated stack transformer, and the second winding is a part of the other of the primary inductor and the secondary inductor.

12 Claims, 8 Drawing Sheets

(56) References Cited

U.S. PATENT DOCUMENTS

| | | | | |
|---|---|---|---|---|
| 2010/0317311 | A1* | 12/2010 | Mirzaei | H04B 1/1036<br>455/307 |
| 2015/0270054 | A1* | 9/2015 | Huang | H01F 27/2804<br>336/200 |
| 2015/0310980 | A1* | 10/2015 | Yen | H01F 5/00<br>336/200 |
| 2015/0310981 | A1* | 10/2015 | Yen | H01F 27/2804<br>336/200 |
| 2015/0364243 | A1* | 12/2015 | Yen | H01F 27/2804<br>336/200 |
| 2017/0162318 | A1* | 6/2017 | Yen | H01L 28/10 |
| 2017/0201223 | A1* | 7/2017 | Aboush | H03B 5/08 |
| 2018/0122561 | A1* | 5/2018 | Yen | H01F 27/2828 |
| 2018/0254139 | A1* | 9/2018 | Yazaki | H01F 27/2804 |
| 2018/0343742 | A1* | 11/2018 | Ando | H01F 27/2804 |
| 2018/0366254 | A1* | 12/2018 | Yen | H01L 23/5227 |
| 2019/0131054 | A1* | 5/2019 | Calanca, Jr. | H01F 27/2804 |
| 2019/0165751 | A1* | 5/2019 | Chen | H04B 1/1027 |
| 2019/0180916 | A1* | 6/2019 | Tseng | H01L 23/645 |
| 2019/0221350 | A1* | 7/2019 | Yen | H01F 27/2804 |
| 2019/0385781 | A1* | 12/2019 | Zhang | H01F 19/04 |
| 2019/0392980 | A1* | 12/2019 | Yen | H01F 27/2828 |
| 2021/0193367 | A1* | 6/2021 | Huang | H01F 27/2804 |
| 2022/0199314 | A1* | 6/2022 | Chen | H01F 27/2804 |

* cited by examiner

INTEGRATED STACK TRANSFORMER

BACKGROUND OF THE INVENTION

1. Field of the Invention

The present invention is related to integrated stack transformers.

2. Description of the Prior Art

In a combination circuit of an integrated stack transformer and a power amplifier, a common mode inductance of the integrated stack transformer is associated with third-order intermodulation distortion (IMD3), i.e. the greater the common mode inductance, the worse the IMD3. Thus, for the purpose of improving signal quality, design of an integrated stack transformer with a lower common mode inductance is an important issue.

SUMMARY OF THE INVENTION

This in mind, an objective of the present invention is to provide an integrated stack transformer with a lower common mode inductance, to solve the problems mentioned in the related art.

In an embodiment of the present invention, an integrated stack transformer is provided. The integrated stack transformer comprises a first winding, a second winding and a third winding implemented by a first metal layer, and a fourth winding and a fifth winding implemented by a second metal layer. The second winding is positioned between the first winding and the third winding. The fourth winding substantially overlaps the first winding. The fifth winding substantially overlaps the third winding. A distance between the fifth winding and the fourth winding is less than a distance between the third winding and the first winding. In addition, the first winding, the third winding, the fourth winding and the fifth winding form a part of one of a primary inductor and a secondary inductor of the integrated stack transformer, and the second winding is a part of the other of the primary inductor and the secondary inductor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
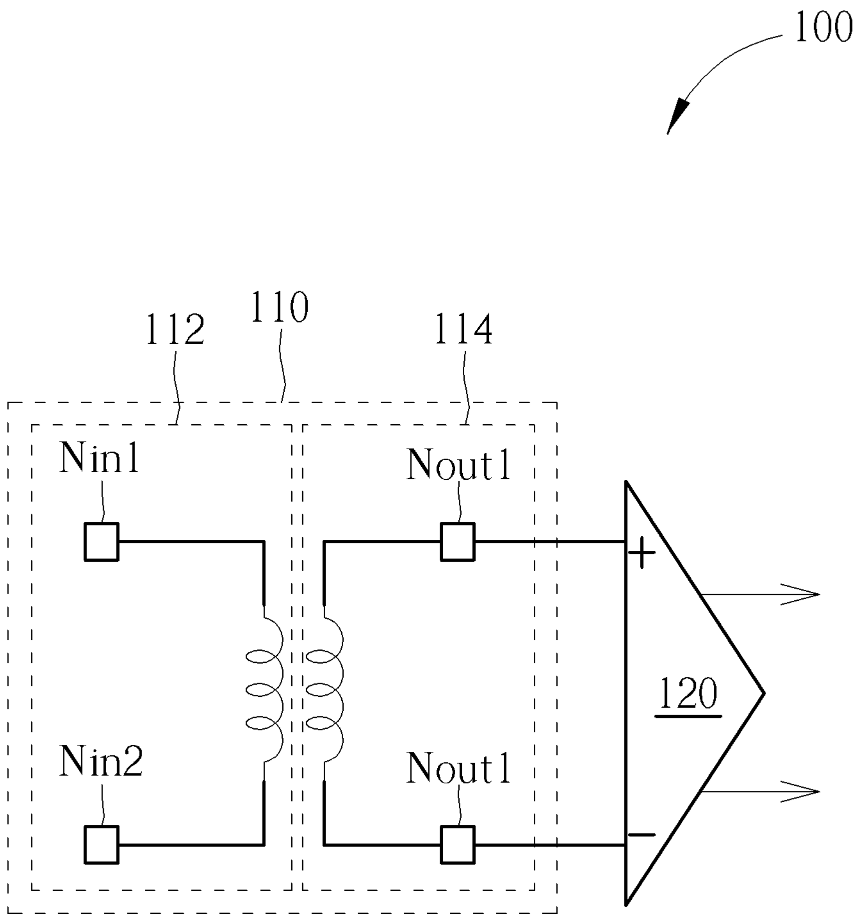
FIG. 1 is a diagram illustrating a circuit according to an embodiment of the present invention.

FIG. 1 is a diagram illustrating a circuit 100 according to an embodiment of the present invention. As shown in FIG. 1, the circuit 100 comprises an integrated stack transformer 110 and a power amplifier 120, wherein the integrated stack transformer 110 comprises a primary inductor 112 and a secondary inductor 114 that are electrically isolated from each other. The primary inductor 112 comprises two input nodes Nin1 and Nin2 of the integrated stack transformer 110, and the secondary inductor 114 comprises two output nodes Nout1 and Nout2 of the integrated stack transformer 110. In this embodiment, the integrated stack transformer 110 is a balanced to unbalanced (balun) transformer, but the present invention is not limited thereto.

Figure 2A:
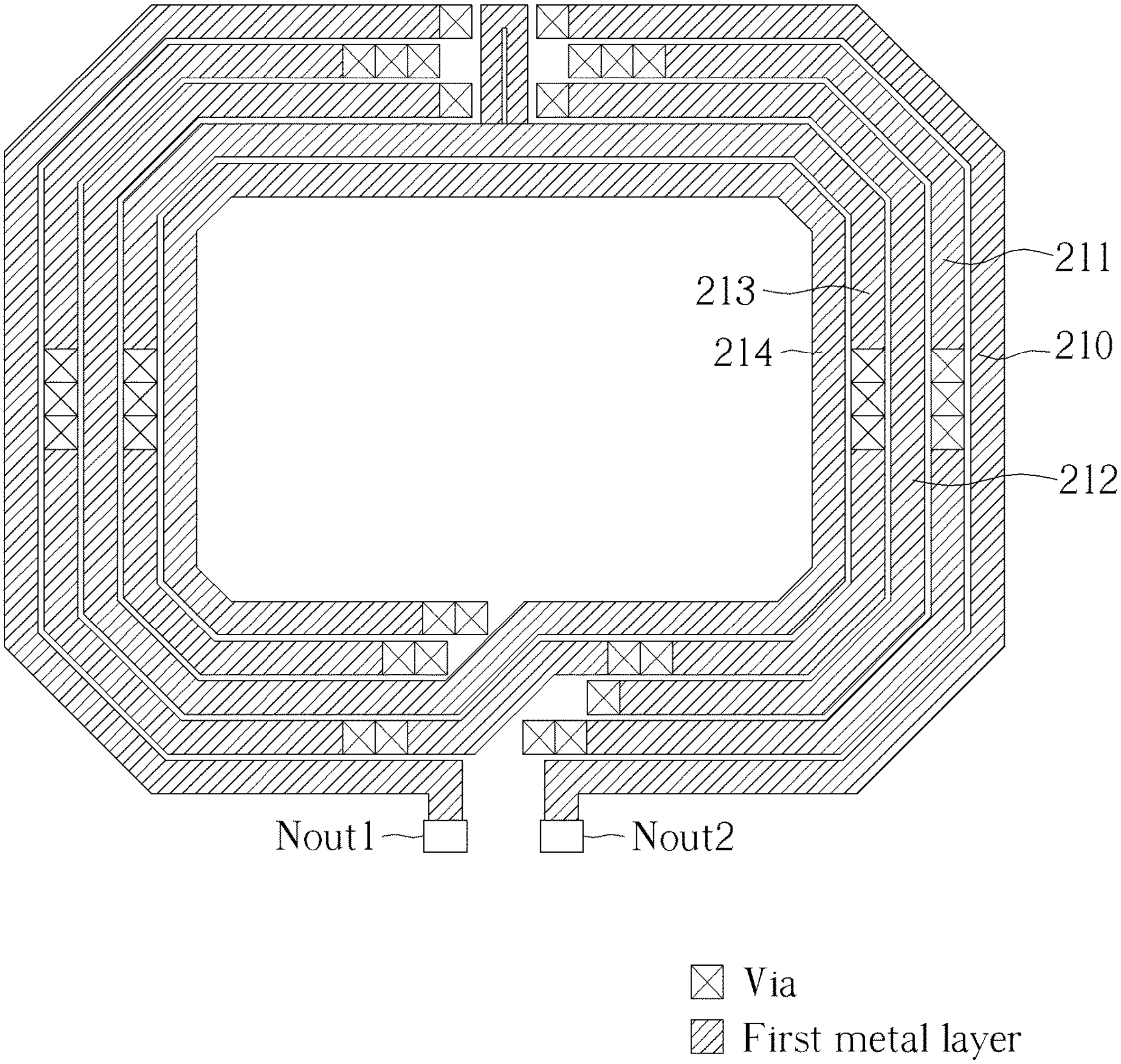
FIG. 2A is a diagram illustrating a first metal layer of an integrated stack transformer according to an embodiment of the present invention.

Refer to FIG. 2A, which is a diagram illustrating a first metal layer of the integrated stack transformer 110. As shown in FIG. 2A, the first metal layer comprises an outermost winding 210, a first winding 211, a second winding 212, a third winding 213 and an innermost winding 214. In this embodiment, the first winding 211 and the third winding 213 act as a part of the primary inductor 112, and the outermost winding 210, the second winding 212 and the innermost winding 214 act as a part of the secondary inductor 114.

Figure 2B:
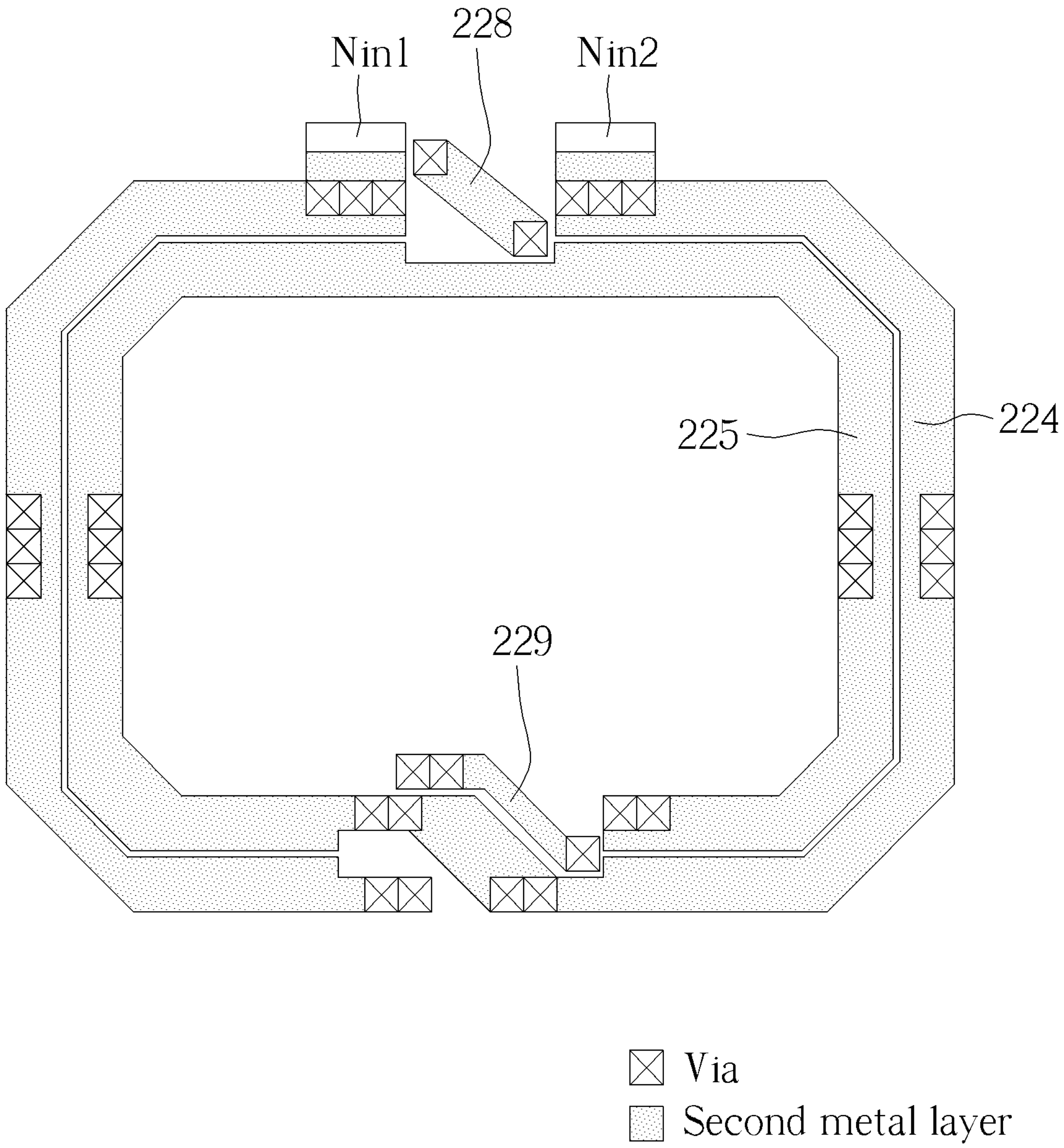
FIG. 2B is a diagram illustrating a second metal layer of an integrated stack transformer according to an embodiment of the present invention.

Refer to FIG. 2B, which is a diagram illustrating a second metal layer of the integrated stack transformer 110. As shown in FIG. 2A, the second metal layer comprises a fourth winding 224, a fifth winding 225 and bridge wires 228 and 229. The fourth winding 224 substantially overlaps the first winding 211 of the first metal layer, a width of the fourth winding 224 is greater than that of the first winding 211, and the fourth winding 224 partially overlaps the second winding 212. The fifth winding 225 substantially overlaps the third winding 213 of the first metal layer, a width of the fifth winding 225 is greater than that of the third winding 213, and the fifth winding 225 partially overlaps the second winding 212. In this embodiment, the fourth winding 224 and the fifth winding 225 are electrically connected to the first winding 211 and the third winding 213 through vias, respectively, i.e. the fourth winding 224 and the fifth winding 225 also act as a part of the primary inductor 112.

Figure 2C:
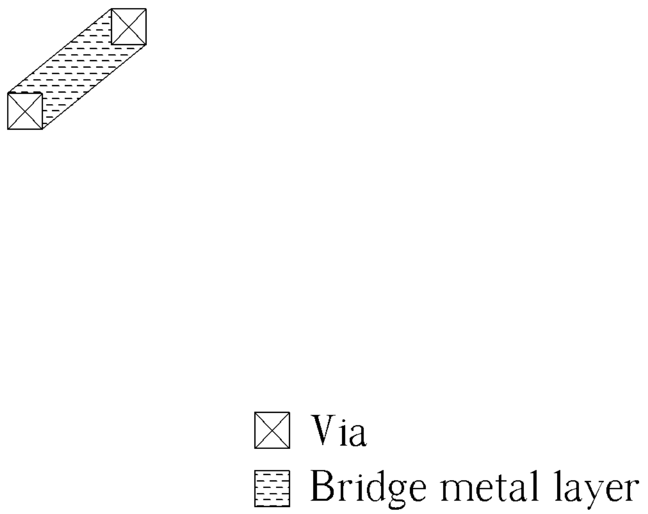
FIG. 2C is a diagram illustrating a bridge metal layer of an integrated stack transformer according to an embodiment of the present invention.

FIG. 2C illustrates a bridge metal layer, which is configured to connect the outermost winding 210 and the second winding 212 of the first metal layer. In addition, FIG. 2D further illustrates a top view of the integrated stack transformer 110.

In this embodiment, the first metal layer is an Ultra-Thick Metal (UTM) layer, the second metal layer is an Aluminum Re-Distribution Layer (RDL), and the bridge metal layer may be any suitable metal layer, but the present invention is not limited thereto. In this embodiment, the first winding 211, the third winding 213, the fourth winding 224 and the fifth winding 225 act as a part of the primary inductor 112 of the integrated stack transformer 110, and the outermost winding 210, the second winding 121 and the innermost winding 214 act as a part of the secondary inductor 114. In other embodiments, however, the first winding 211, the third winding 213, the fourth winding 224 and the fifth winding 225 may act as a part of the secondary inductor 114, and the outermost winding 210, the second winding 212 and the innermost winding 214 may act as a part of the primary inductor 112, but the present invention is not limited thereto.

Figure 2D:
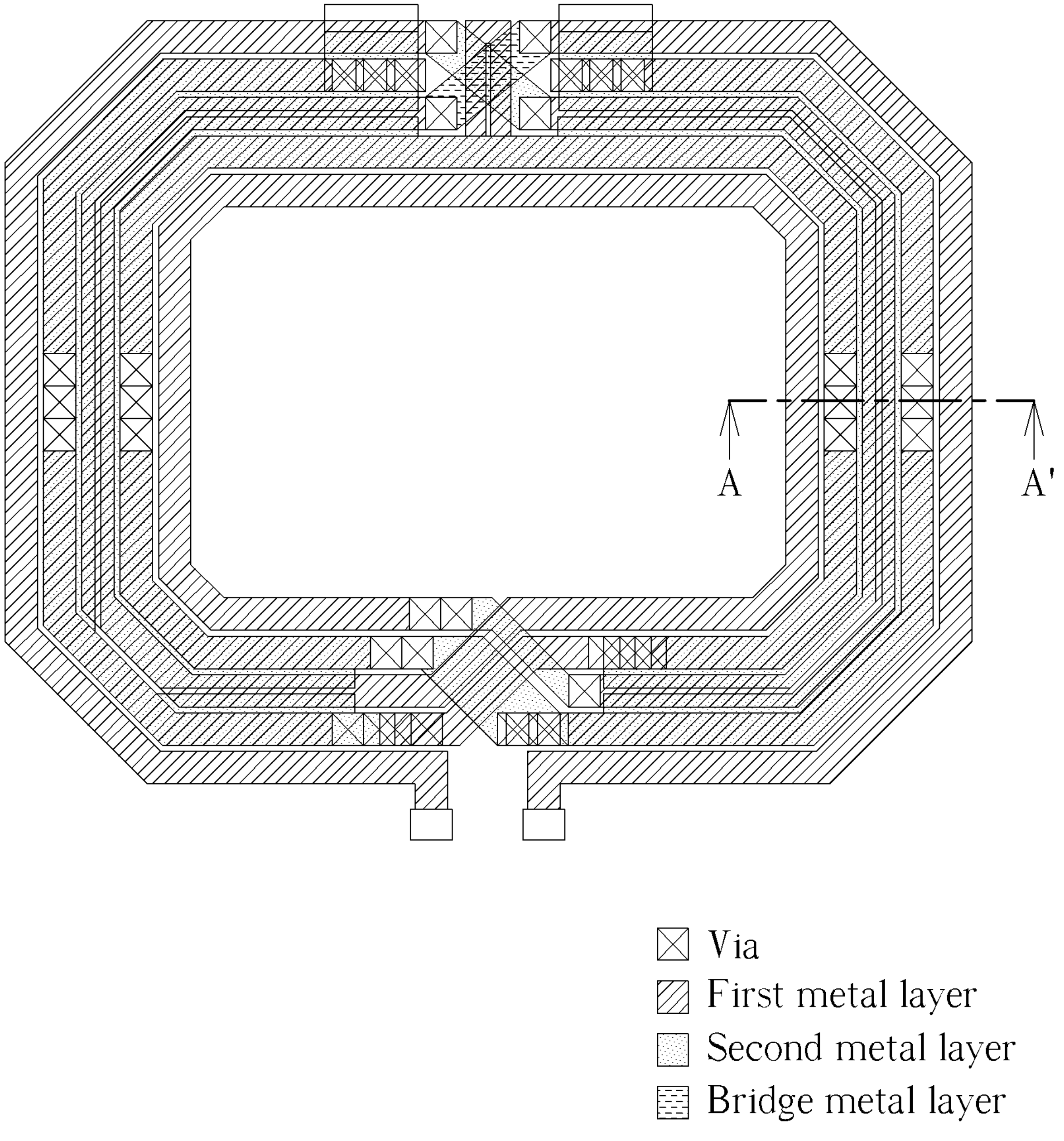
FIG. 2D is a top view of an integrated stack transformer according to an embodiment of the present invention.
Figure 3:
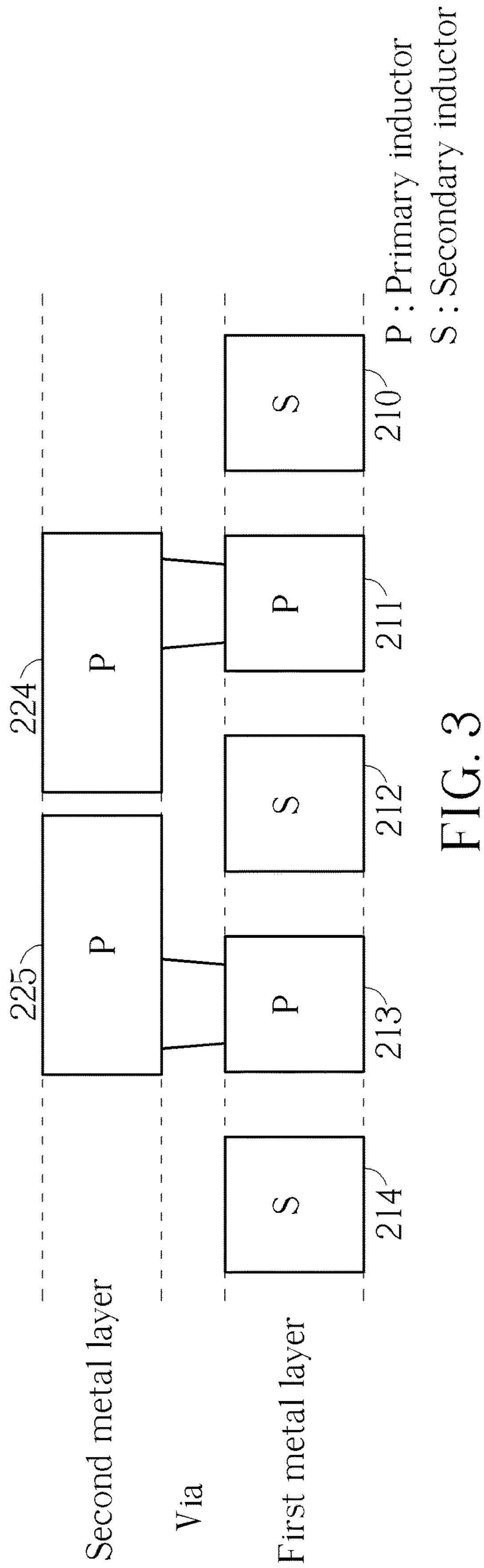
FIG. 3 illustrates a cross section of an integrated stack transformer according to an embodiment of the present invention.

FIG. 3 is a cross-sectional diagram illustrating an A-A' cross section of FIG. 2D. As shown in FIG. 3, by increasing the width of the fourth winding 224 to make the fourth winding 224 partially overlap the second winding 212, and by increasing the width of the fifth winding 225 to make the fifth winding 225 partially overlap the second winding 212, the distance between the fourth winding 224 and the fifth winding 225 may be reduced to thereby further increase a mutual inductance of the primary inductor 112. As the mutual inductance of the primary inductor 112 is increased, a common mode inductance of the primary inductor 112 may be reduced, and third-order intermodulation distortion (IMD3) of the circuit 100 can be improved to enhance signal quality. In addition, in FIG. 3, the first winding 211, the third winding 213, the fourth winding 224 and the fifth winding 225 belonging to the primary inductor 112 are annotated with "P", and the outermost winding 210, the second winding 212 and the innermost winding 214 belonging to the second inductor 114 are annotated with "S".

In one embodiment, for the purpose of increasing the mutual inductance of the primary inductor 112 as much as possible, the distance between the fourth winding 224 and the fifth winding 225 may be reduced as much as possible, e.g. the distance between the fourth winding 224 and the fifth winding 225 is the minimum spacing allowed to be used in a process for the second metal layer. For example, assuming that the second metal layer is an Aluminum RDL, the distance between the fourth winding 224 and the fifth winding 225 may be approximately 2 micrometers (um).

Figure 4:
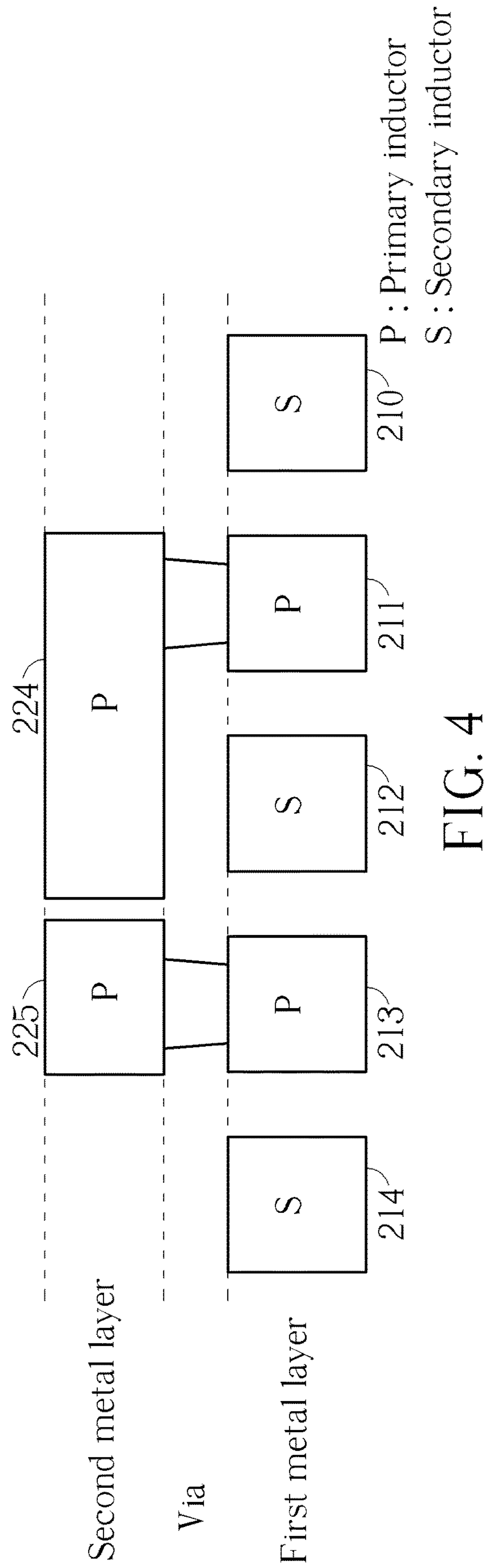
FIG. 4 illustrates a cross section of an integrated stack transformer according to another embodiment of the present invention.

It should be noted that the distance between the fourth winding 224 and the fifth winding 225 of the embodiments shown in FIG. 2A to FIG. 2D are for illustrative purposes only, and are not limitations of the present invention. In other embodiments, as long as the distance between the fourth winding 224 and the fifth winding 225 is less than a distance between the third winding 213 and the first winding 211, the fourth winding 224 does not have to overlap the second winding 212, and/or the fifth winding 225 does not have to overlap the second winding 212. In addition, the width of the fourth winding 224 and the width of the fifth winding 225 do not have to be the same, e.g. widths of two windings implemented by the second metal layer shown in FIG. 4 are different. These alternative designs also belong to the scope of the present invention.

Figure 5:
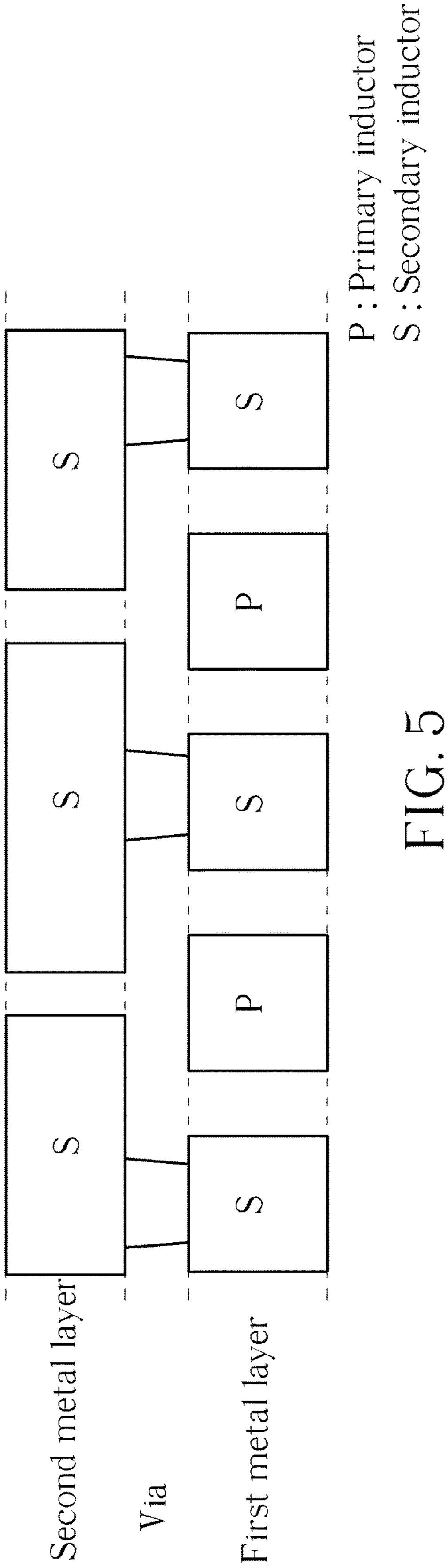
FIG. 5 illustrates a cross section of an integrated stack transformer according to another embodiment of the present invention.

In the embodiments shown in FIG. 2A to FIG. 2D, the fourth winding 224 and the fifth winding 225 implemented by the second metal layer are configured to increase the mutual inductance of the primary inductor 112. In other embodiments, multiple windings implemented by the second metal layer may be configured to increase a mutual inductance of the secondary inductor 114; for example, those shown in the cross-sectional diagram of FIG. 5. As those skilled in this art can understand the implementation shown in FIG. 5 according to the embodiments of FIG. 2A to FIG. 2D, related details are omitted for brevity.

Figure 6:
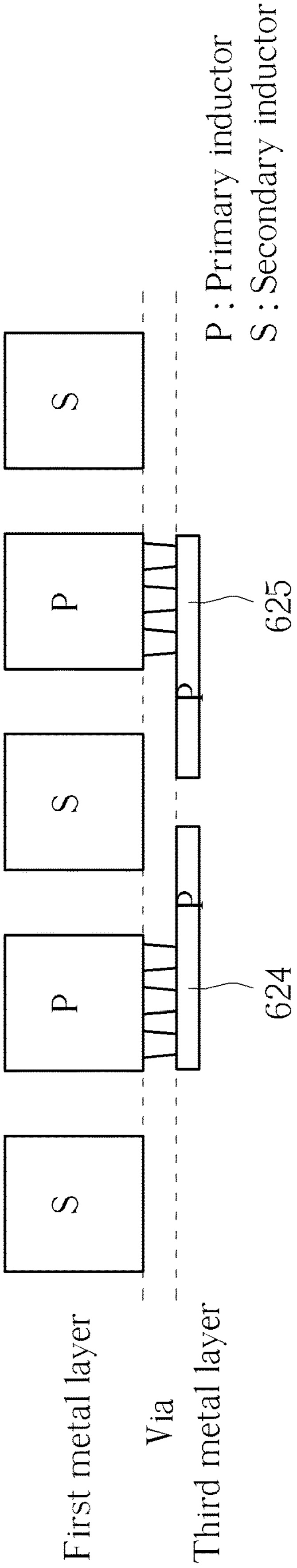
FIG. 6 illustrates a cross section of an integrated stack transformer according to another embodiment of the present invention.

In the embodiments shown in FIG. 2A to FIG. 2D, the second metal layer is implemented above the first metal layer. In some embodiments, the second metal layer may be implemented below the first metal layer. For example, the fourth winding 224 and the fifth winding 225 shown in FIG. 2A to FIG. 2D may be implemented by a third metal layer shown in FIG. 6, i.e. the fourth winding 224 and the fifth winding 225 belonging to the primary inductor 112 may be replaced with a fourth winding 624 and a fifth winding 625 shown in FIG. 6, where the third metal layer may be any metal layer implemented below the UTM layer (i.e. a process time of the third metal layer is earlier than a process time of the UTM layer).

Figure 7:
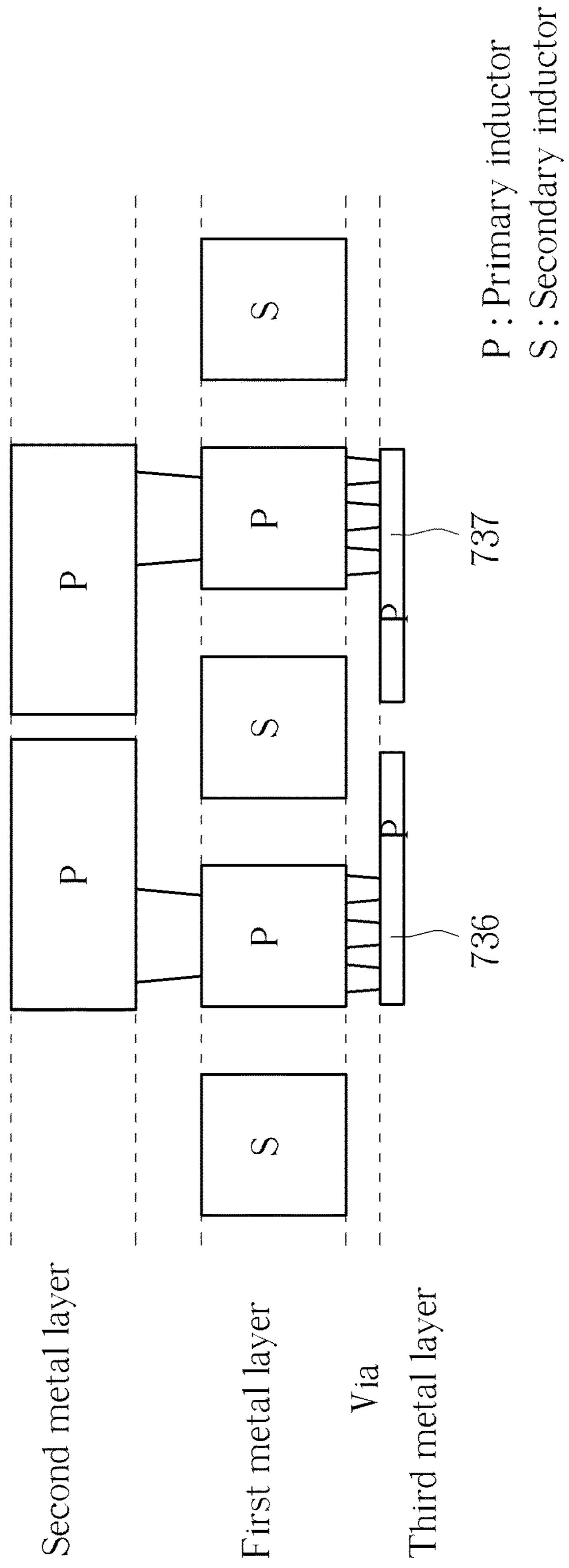
FIG. 7 illustrates a cross section of an integrated stack transformer according to another embodiment of the present invention.

In another embodiment of the present invention, the embodiments shown in FIG. 2A to FIG. 2D and FIG. 6 may be combined to utilize the second metal layer and the third metal layer to implement multiple windings of the primary inductor 112 as shown in FIG. 7, and the mutual inductance of the primary inductor 112 may be further enhanced. In detail, in the embodiment of the present invention, two windings implemented by the third metal layer may be regarded as a sixth winding 736 and a seventh winding 737 of the primary inductor 112, and a distance between the sixth winding 736 and the seventh winding 737 is less than the distance between the first winding 211 and the third winding 213. In another embodiment, the distance between the sixth winding 736 and the seventh winding 737 may be further designed to be the minimum spacing allowed to be used in a process for the third metal layer.

Briefly summarized, the integrated stack transformer of the present invention implements multiple windings with small spacing by utilizing the second metal layer. This can effectively increase the mutual inductance of the primary/secondary inductor and reduce the common mode inductance, to thereby improve the IMD3 of the circuit 100 and enhance the signal quality. In addition, implementations of the embodiments of the present invention will not require additional chip area of the integrated stack transformer, so the signal quality can be improved without increasing manufacturing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated stack transformer, comprising:

a first winding;

a second winding;

a third winding, wherein the first winding, the second winding and the third winding are implemented by a first metal layer, and the second winding is positioned between the first winding and the third winding;

a fourth winding, implemented by a second metal layer, wherein the fourth winding substantially overlaps the first winding; and a fifth winding, implemented by the second metal layer, wherein the fifth winding substantially overlaps the third winding, and a distance between the fifth winding and the fourth winding is less than a distance between the third winding and the first winding;

wherein the first winding, the third winding, the fourth winding and the fifth winding form a part of one of a primary inductor and a secondary inductor of the integrated stack transformer, and the second winding is a part of the other of the primary inductor and the secondary inductor;

wherein the fourth winding overlaps at least one portion of the second winding, and the fifth winding overlaps at least one portion of the second winding.

2. The integrated stack transformer of claim 1, wherein the distance between the fifth winding and the fourth winding is a minimum spacing allowed to be used in a process for the second metal layer.

3. The integrated stack transformer of claim 1, wherein the first metal layer is an Ultra-Thick Metal (UTM) layer, and the second metal layer is an Aluminum Re-Distribution Layer (RDL).

4. The integrated stack transformer of claim 1, further comprising:

a sixth winding, implemented by a third metal layer, wherein the sixth winding substantially overlaps the first winding; and a seventh winding, implemented by the third metal layer, wherein the seventh winding substantially overlaps the third winding, and a distance between the seventh winding and the sixth winding is less than the distance between the third winding and the first winding.

5. The integrated stack transformer of claim 1, wherein the distance between the fifth winding and the fourth winding is a minimum spacing allowed to be used in a process for the second metal layer.

6. The integrated stack transformer of claim 1, wherein the first metal layer is an Ultra-Thick Metal (UTM) layer, and the second metal layer is an Aluminum Re-Distribution Layer (RDL).

7. The integrated stack transformer of claim 1, further comprising:

a sixth winding, implemented by a third metal layer, wherein the sixth winding substantially overlaps the first winding; and a seventh winding, implemented by the third metal layer, wherein the seventh winding substantially overlaps the third winding, and a distance between the seventh winding and the sixth winding is less than the distance between the third winding and the first winding.

8. The integrated stack transformer of claim 1, further comprising:

a sixth winding, implemented by a third metal layer, wherein the sixth winding substantially overlaps the first winding; and a seventh winding, implemented by the third metal layer, wherein the seventh winding substantially overlaps the third winding, and a distance between the seventh winding and the sixth winding is less than the distance between the third winding and the first winding.

9. The integrated stack transformer of claim 8, wherein the sixth winding overlaps at least one portion of the second winding, or the seventh winding overlaps at least one portion of the second winding.

10. An integrated stack transformer, comprising:

a first winding;

a second winding;

a third winding, wherein the first winding, the second winding and the third winding are implemented by a first metal layer, and the second winding is positioned between the first winding and the third winding;

a fourth winding, implemented by a second metal layer, wherein the fourth winding substantially overlaps the first winding;

a fifth winding, implemented by the second metal layer, wherein the fifth winding substantially overlaps the third winding, and a distance between the fifth winding and the fourth winding is less than a distance between the third winding and the first winding;

a sixth winding, implemented by a third metal layer, wherein the sixth winding substantially overlaps the first winding; and a seventh winding, implemented by the third metal layer, wherein the seventh winding substantially overlaps the third winding, and a distance between the seventh winding and the sixth winding is less than the distance between the third winding and the first winding;

wherein the first winding, the third winding, the fourth winding and the fifth winding form a part of one of a primary inductor and a secondary inductor of the integrated stack transformer, and the second winding is a part of the other of the primary inductor and the secondary inductor;

wherein the sixth winding overlaps at least one portion of the second winding, and the seventh winding overlaps at least one portion of the second winding.

11. The integrated stack transformer of claim 10, wherein the distance between the seventh winding and the sixth winding is a minimum spacing allowed to be used in a process for the third metal layer.

12. The integrated stack transformer of claim 10, wherein the first metal layer is positioned between the second metal layer and the third metal layer.

* * * * *